(12) United States Patent
Yamano et al.

(10) Patent No.: US 10,731,585 B2
(45) Date of Patent: Aug. 4, 2020

(54) CONTROL DEVICE OF AN INTERNAL COMBUSTION ENGINE AND A CONTROL METHOD THEREOF

(71) Applicant: NISSAN MOTOR CO., LTD., Yokohama-shi, Kanagawa (JP)

(72) Inventors: Kentarou Yamano, Kanagawa (JP); Takao Kawasaki, Kanagawa (JP)

(73) Assignee: NISSAN MOTOR CO., LTD., Yokohama-shi, Kanagawa (JP)

(*) Notice: Subject to any disclaimer, the term of this patent is extended or adjusted under 35 U.S.C. 154(b) by 0 days.

(21) Appl. No.: 15/119,213

(22) PCT Filed: Feb. 26, 2014

(86) PCT No.: PCT/JP2014/054737
§ 371 (c)(1),
(2) Date: Aug. 16, 2016

(87) PCT Pub. No.: WO2015/128972
PCT Pub. Date: Sep. 3, 2015

(65) Prior Publication Data
US 2017/0009687 A1 Jan. 12, 2017

(51) Int. Cl.
F02D 41/10 (2006.01)
F02D 35/02 (2006.01)
(Continued)

(52) U.S. Cl.
CPC .......... F02D 41/107 (2013.01); F02D 23/00 (2013.01); F02D 35/025 (2013.01);
(Continued)

(58) Field of Classification Search
CPC .... F02D 41/107; F02D 41/064; F02D 35/025; F02D 23/00; F02D 2200/101;
(Continued)

(56) References Cited

U.S. PATENT DOCUMENTS

2013/0333662 A1* 12/2013 Okada ................. F02D 35/02
123/319
2014/0360444 A1* 12/2014 Morita ................ F02D 35/025
123/41.08

FOREIGN PATENT DOCUMENTS

EP 2677151 A1 12/2013
JP S62-13843 A 5/1987
(Continued)

OTHER PUBLICATIONS

JP 2001193534 A—English Translation.*
JP 2001193534 A—English Translation (Year: 2001).*

Primary Examiner — Joseph J Dallo
Assistant Examiner — Scott A Reinbold
(74) Attorney, Agent, or Firm — Faegre Drinker Biddle & Reath LLP

(57) ABSTRACT

A control device of an internal combustion engine calculates an abnormal combustion prevention torque for preventing an abnormal combustion due to self-ignition whose heat source is a mixture of supplied fuel to the internal combustion engine and lubricant oil, on the basis of a cylinder wall temperature of the internal combustion engine or a temperature of a parameter in correlation with the cylinder wall temperature, and controls a torque of the internal combustion engine to prevent the torque of the internal combustion engine from becoming equal to or more than the abnormal combustion prevention torque.

8 Claims, 12 Drawing Sheets

(51) Int. Cl.
  *F02P 5/153*   (2006.01)
  *F02P 5/152*   (2006.01)
  *F02D 23/00*   (2006.01)
  *F02D 41/06*   (2006.01)
  *F02D 41/22*   (2006.01)
  *F02D 41/04*   (2006.01)

(52) U.S. Cl.
  CPC ............ *F02D 41/064* (2013.01); *F02P 5/152* (2013.01); *F02P 5/153* (2013.01); *F02D 35/027* (2013.01); *F02D 41/047* (2013.01); *F02D 41/068* (2013.01); *F02D 41/22* (2013.01); *F02D 2200/021* (2013.01); *F02D 2200/023* (2013.01); *F02D 2200/0414* (2013.01); *F02D 2200/101* (2013.01); *F02D 2200/1015* (2013.01); *F02D 2250/18* (2013.01); *F02D 2250/26* (2013.01); *Y02T 10/144* (2013.01); *Y02T 10/46* (2013.01)

(58) Field of Classification Search
  CPC ....... F02D 2200/0414; F02D 2200/023; F02D 2200/021; F02D 41/068; F02D 41/047; F02D 2250/18; F02D 2250/26; F02D 35/027; F02D 41/22; F02D 2200/1015; F02P 5/152; F02P 5/153; Y02T 10/144; Y02T 10/46
  USPC ........................................................ 123/319
  See application file for complete search history.

(56) References Cited

FOREIGN PATENT DOCUMENTS

| JP | H06-159209 A | | 6/1994 |
|---|---|---|---|
| JP | 2001-193534 A | | 7/2001 |
| JP | 2001193534 A | * | 7/2001 |
| JP | 2001193534 A | * | 7/2001 |
| JP | 2011-106411 A | | 6/2011 |
| WO | WO 2013/118244 A1 | | 8/2013 |

* cited by examiner

CONTROL DEVICE OF AN INTERNAL COMBUSTION ENGINE AND A CONTROL METHOD THEREOF

TECHNICAL FIELD

The present invention relates to a control device of an internal combustion engine and a control method thereof.

BACKGROUND ART

JP2011-106411A discloses, as a conventional internal combustion engine control device, one that calculates an upper limit of an engine torque (intake air amount) on the basis of an intake pressure and engine rotation speed and further correcting this upper limit in accordance with an engine water temperature, to prevent an occurrence of abnormal combustion due to self-ignition of a fuel-air mixture.

SUMMARY OF INVENTION

In this conventional internal combustion engine control device, generally, as the engine water temperature increases, the temperature inside the cylinder also increases, which thus makes it easy for the fuel-air mixture to self-ignite. Accordingly, correction was made to reduce the upper limit of the engine torque with the increase in the engine water temperature.

However, a presence of an abnormal combustion caused by self-ignition was found, which abnormal combustion tends to happen easily at a lower engine water temperature, due to a cause different from such a general cause of the occurrence of self-ignition. Such an abnormal combustion cannot be prevented even if the upper limit of the engine torque is reduced with the increase in the engine water temperature, as in the conventional cases.

The present invention was accomplished by focusing on such a problem, and an object thereof is to prevent an abnormal combustion that occurs due to a cause different from the general cause for the occurrence of self-ignition.

A control device of an internal combustion engine according to one aspect of the present invention calculates an abnormal combustion prevention torque for preventing an abnormal combustion due to self-ignition whose heat source is a mixture of supplied fuel to the internal combustion engine and lubricant oil, on the basis of a cylinder wall temperature of the internal combustion engine or a temperature of a parameter in correlation with the cylinder wall temperature, and controls a torque of the internal combustion engine to prevent the torque of the internal combustion engine from becoming equal to or more than the abnormal combustion prevention torque.

DESCRIPTION OF EMBODIMENTS

The following describes an embodiment of the present invention, with reference to the drawings.

First Embodiment

Figure 1:
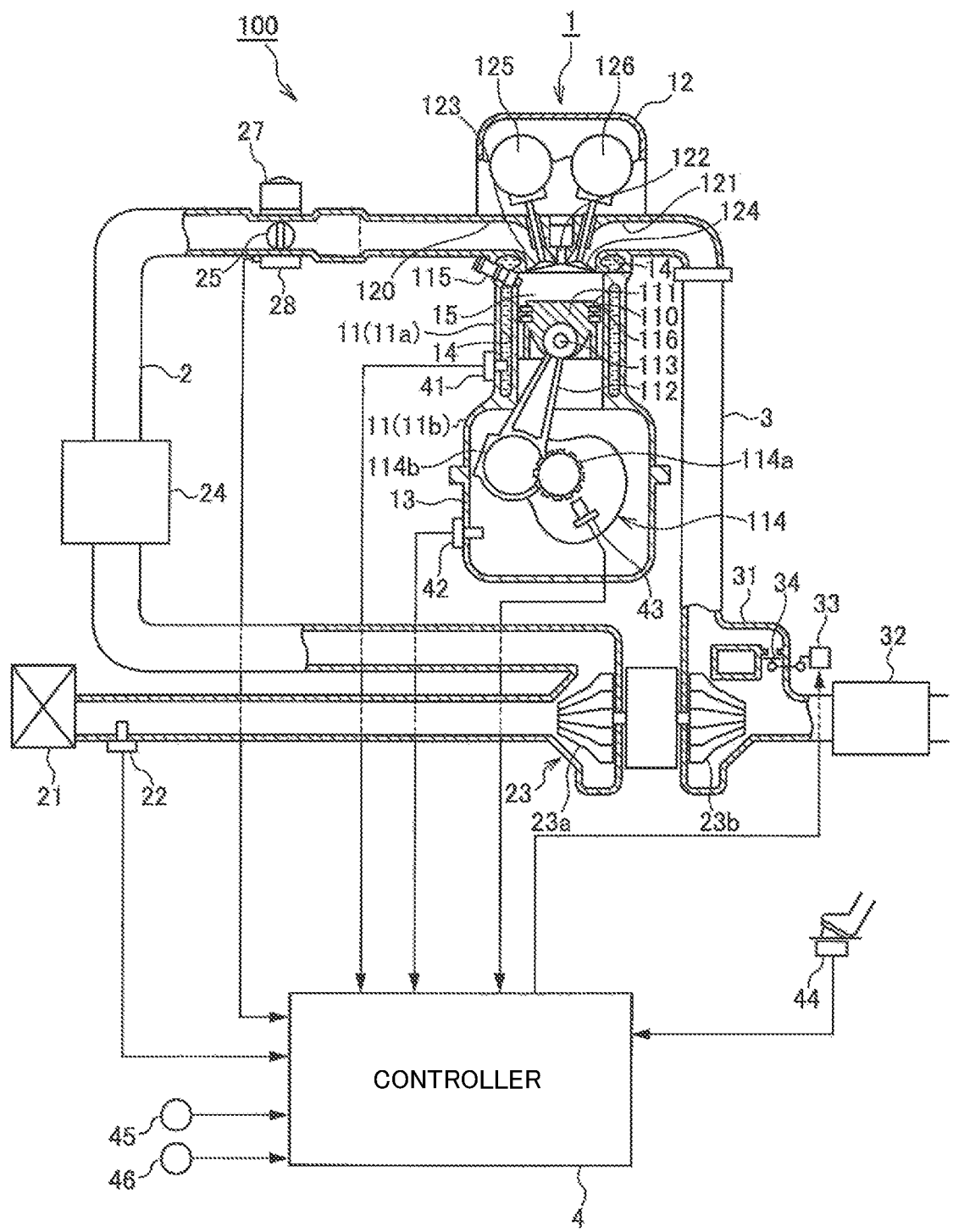
FIG. 1 is a schematic view of a control device of a spark-ignition type internal combustion engine according to a first embodiment of the present invention.

FIG. 1 is a schematic view of a control device 100 of a spark-ignition type internal combustion engine (hereinafter, called "engine") 1, according to a first embodiment of the present invention.

The control device 100 of the engine 1 includes an engine 1, an intake passage 2 through which air taken into the engine 1 passes (hereinafter, called "intake air") flows, an exhaust passage 3 through which combustion gas discharged from the engine 1 (hereinafter, called "exhaust air") flows, and a controller 4.

The engine 1 includes a cylinder block 11, a cylinder head 12, an oil pan 13, and a water jacket 14.

The cylinder block 11 includes a cylinder section 11a and a crank case section 11b.

The cylinder section 11a has a plurality of cylinders 110 formed therein, and is attached with a fuel injection valve 115 that injects fuel directly into a combustion chamber 15. The cylinder 110 houses a piston 111 therein; the piston 111 reciprocates inside the cylinder 110 upon receiving fuel pressure.

Inserted inside the piston 111 is a piston pin 113 for attaching one end of the connecting rod 112. Moreover, a plurality of piston rings 116 is provided on a side surface of the piston 111. The piston ring 116 serves to maintain airtightness in the combustion chamber 15, and serves to scrape off excess lubricant oil on an inner wall surface (hereinafter, called "cylinder wall surface") of the cylinder 110 at the time of piston reciprocation and form a suitable oil film on the cylinder wall surface.

The crank case section 11b is formed lower of the cylinder section 11a. A crank shaft 114 is housed inside the crank case section 11b. The crank shaft 114 includes a crank journal 114a supported in the crank case section 11b in a rotatable manner, and a crank pin 114b connected to the other end of the connecting rod 112. The crank shaft 114 converts the reciprocal movement of the piston 111 into a rotational movement, via the connecting rod 112.

The cylinder head 12 is provided on an upper surface of the cylinder block 11, and forms one part of the combustion chamber 15 together with the cylinder 110 and piston 111.

The cylinder head 12 has an intake port 120 connected to the intake passage 2 and opening at a top wall of the combustion chamber 15, and an exhaust port 121 connected to the exhaust passage 3 and opening at the top wall of the combustion chamber 15; furthermore, a spark plug 122 is provided in a center of the top wall of the combustion chamber 15 to which to be faced. Moreover, the cylinder head 12 has an intake valve 123 that opens and closes an opening of the combustion chamber 15 with the intake port 120, and an exhaust valve 124 that opens and closes an opening of the combustion chamber 15 with the exhaust port 121. Furthermore, the cylinder head 12 has an intake valve opening and closing device 125 to open and close the intake valve 123, and an exhaust valve opening and closing device 126 to open and close the exhaust valve 124. The intake valve opening and closing device 125 and the exhaust valve opening and closing device 126 each include an operating angle/lift variable mechanism (VVEL; Variable Valve Event & lift) that changes an operating angle/lift of the respective intake valve 123 and exhaust valve 124, and a phase variable mechanism (VTC; Variable Valve Timing Control) that advances or delays a phase of a center angle of the lift.

The oil pan 13 is provided at a lower part of the cylinder block 11. The oil pan 13 stores lubricant oil to be supplied to friction portions where frictional heat generates, such as sliding sections and rotational sections inside the engine. The lubricant oil stored in the oil pan 13 is forcefully fed to a main gallery formed in the crank case section 11b by an oil pump driven by the crank shaft 114. The lubricant oil forcefully fed to the main gallery first lubricates the crank journal 114a of the crank shaft 114, and then lubricates the crank pin 114b via an oil passage formed inside the crank shaft 114. Furthermore, the lubricant oil is injected from an oil jet at the connecting rod 112, and lubricates the cylinder 110 and the piston pin 113. While, the lubricant oil fed to the cylinder head 12 separately to the main gallery lubricates each of the sliding sections through an oil passage formed inside the intake valve opening and closing device 125 and exhaust valve opening and closing device 126.

The water jacket 14 is a passage through which cooling water for cooling the surroundings of the combustion chamber 15 flows, and is formed inside each of the cylinder section 11a of the cylinder block 11 and the cylinder head 12.

The intake passage 2 is provided with, in order from upstream thereof, an air cleaner 21, an airflow sensor 22, a compressor 23a of a turbocharger 23, an intercooler 24, and an electronically-controlled throttle valve 25.

The air cleaner 21 removes extraneous material such as sand that is contained in the intake air.

The airflow sensor 22 detects an intake air amount.

The turbocharger 23 is a device that forcefully compresses the intake air by using exhaust air energy, and supplies the compressed intake air to the cylinder 110. This enhances filling efficiency, and thus output of the engine 1 increases. The compressor 23a is a component configuring one part of the turbocharger 23, and is rotated by a turbine 23b of the turbocharger 23 described later provided on the same axis to forcefully compress the intake air.

The intercooler 24 cools the compressed intake air that has a high temperature. This thus holds down the reduction in volume density and further enhances the filling efficiency, and also holds down the increase in temperature of the fuel-air mixture due to the high temperature intake air being taken into the cylinder 110, thereby preventing the occurrence of knocking.

The throttle valve 25 adjusts the amount of intake air taken into the cylinder 110, by changing the passage sectional area of the intake passage 2. The throttle valve 25 is opened and closed by a throttle actuator 27, and an aperture thereof (hereinafter, called "throttle aperture") is detected by a throttle sensor 28.

The exhaust passage 3 is provided with, in order from upstream thereof, a turbine 23b of the turbocharger 23, a bypass passage 31, and a three-way catalyst 32.

The turbine 23b is a component constituting one part of the turbocharger 23, and is rotated by the exhaust air energy and drives the compressor 23a provided on the same axis.

The bypass passage 31 is a passage that connects an upstream section and a downstream section of the turbine 23b, so as to detour the turbine 23b.

The bypass passage 31 has a wastegate valve 34 that is driven by a wastegate actuator 33 and that can continuously adjust a passage sectional area of the bypass passage 31. When the wastegate valve 34 is opened, one part of the exhaust air that flows through the exhaust passage 3 flows into the bypass passage 31, detours through the turbine 23b and is discharged to external air. Therefore, by adjusting an aperture of the wastegate valve 34, it is possible to adjust the flow rate of the exhaust air flowing into the turbine 23b and control a rotational speed of the turbine 23b. That is to say, by adjusting the aperture of the wastegate valve 34, it is possible to control a pressure of the intake air that is compressed by the compressor 23a (hereinafter, called "boost pressure").

The three-way catalyst 32 removes toxic substances inside the exhaust air, such as hydrocarbon and nitrogen oxides.

The controller 4 is configured of a microcomputer including a central processing unit (CPU), a read-only memory (ROM), a random access memory (RAM), and an input/output interface (I/O interface).

Other than detection signals of the aforementioned airflow sensor 22 and throttle sensor 28, the controller 4 receives detection signals from various sensors that detect operating states of the engine 1, such as a water temperature sensor 41 for detecting a temperature of cooling water flowing through the water jacket 14 (hereinafter, called "engine water temperature"), an oil temperature sensor 42 for detecting a temperature of the lubricant oil (hereinafter, called "engine oil temperature"), an engine rotation speed sensor 43 for detecting the engine rotation speed on the basis of a crank angle, an accelerator stroke sensor 44 for detecting a depressed amount of an accelerator pedal (hereinafter, called "accelerator depressed amount"), an intake air temperature sensor 45 for detecting an intake air temperature after boosted or an intake air temperature downstream of the intercooler 24, and a vibration sensor 46 provided to the cylinder block 11 for detecting whether an abnormal combustion is occurring inside the combustion chamber 15.

Furthermore, the controller 4 optimally controls for example the throttle aperture, a fuel injection amount, and an ignition timing in accordance with the detected operating states of the engine 1.

For example, the controller 4 controls the throttle aperture, the fuel injection amount, and the ignition timing so that no abnormal combustion occurs within the combustion chamber 15 due to knocking or pre-ignition, and so that the abnormal combustion is overcome promptly in a case in which the abnormal combustion is detected.

Knocking is a phenomenon in which, after the fuel-air mixture is ignited with the spark plug 122, unburnt parts of the fuel-air mixture self-ignites during flame propagation. Pre-ignition is a phenomenon in which the fuel-air mixture self-ignites before the fuel-air mixture is ignited with the spark plug 122. Since vibration levels detected by the vibration sensor 46 are different between when the knocking occurs and when the pre-ignition occurs, it is possible to determine the cause of the abnormal combustion in accordance with the vibration level.

Here, the abnormal combustion caused by the knocking or the pre-ignition generally occurs easily as the temperature of the cylinder wall surface (hereinafter, called "cylinder wall temperature") and a temperature of a piston crown surface becomes a high temperature. This is because, in the case of the knocking, the more the cylinder wall temperature increases to a high temperature, the unburnt fuel-air mixture (end gas) in the vicinity of the cylinder wall surface and piston crown surface becomes easily self-ignited. Moreover, in the case of the pre-ignition, the more the cylinder wall temperature increases to a high temperature, the temperature within the combustion chamber 15 (hereinafter, called "temperature inside cylinder") also increases, and the fuel-air mixture becomes easily ignited before the ignition.

With such an abnormal combustion by the knocking, it is possible to prevent this by suitably controlling the ignition timing, and in a case in which the abnormal combustion occurs, this can be overcome by delaying the ignition timing. Moreover, with such an abnormal combustion by the pre-ignition, by enriching the fuel-air ratio, the temperature inside the cylinder is decreased by latent heat of vaporized fuel; this thus allows for preventing or overcoming the pre-ignition.

However, an abnormal combustion due to self-ignition may occur also when the cylinder wall temperature is at a low temperature. The following describes an abnormal combustion that occurs when the cylinder wall temperature is at a low temperature (hereinafter, called "low temperature abnormal combustion"; may also be called superknock or megaknock).

When the cylinder wall temperature is at a high temperature, even if fuel adheres on the cylinder wall surface, the adhered fuel quickly evaporates. While, when the cylinder wall temperature is at a low temperature, not limited to the engine 1 of a cylinder direct injection type of the present embodiment but also in an engine of a port injection type, it is difficult for the fuel adhered on the cylinder wall surface to evaporate, and easily comes into a state in which the fuel is adhered on the cylinder wall surface as droplets.

An oil film made of lubricant oil is formed on the cylinder wall surface for preventing a direct contact between the cylinder wall surface and the piston 111. Therefore, in a state in which fuel is adhered on the cylinder wall surface, the lubricant oil and fuel is scraped of together by the piston ring when the piston ascends.

At this time, a mixture of the lubricant oil and fuel that could not be completely scraped off easily accumulates in a space surrounded by the cylinder wall surface, the side surface of the piston 111, and the piston ring 116 (so-called clevis section). The viscosity of this mixture is lower than that of the lubricant oil by the amount that the fuel is contained. Therefore, as the proportion of the fuel inside the mixture increases, the viscosity of the mixture decreases, and thus the mixture is easily dispersed within the combustion chamber 15 from the clevis section at the time of piston ascending.

When the mixture dispersed at the time of piston ascending evaporates within the combustion chamber 15, a fuel-air mixture having a higher self-ignition ability than a regular fuel-air mixture is formed, and this fuel-air mixture self-ignites and causes the low temperature abnormal combustion to occur. This low temperature abnormal combustion may occur before igniting with the spark plug 122, or may occur during flame propagation after being ignited with the spark plug 122.

As such, the low temperature abnormal combustion occurs by the dispersion of the mixture of lubricant oil and fuel within the combustion chamber 15, and easily occurs with a lower cylinder wall temperature. This is because, the lower the cylinder wall temperature is, the more the fuel that adheres to the cylinder wall surface as droplets increases and the lower the viscosity of the mixture is, thus making it easier for the mixture to disperse.

This low temperature abnormal combustion does not depend on the ignition timing, and also if the fuel-air ratio is enriched, the fuel that adheres on the cylinder wall surface as droplets increases on the contrary; this rather makes the low temperature abnormal combustion occur more easily.

Accordingly, the present embodiment prevents the occurrence of this low temperature abnormal combustion by restricting the upper limit of the engine torque suitably in accordance with the cylinder wall temperature, to hold down the fuel injection amount.

Figure 2:
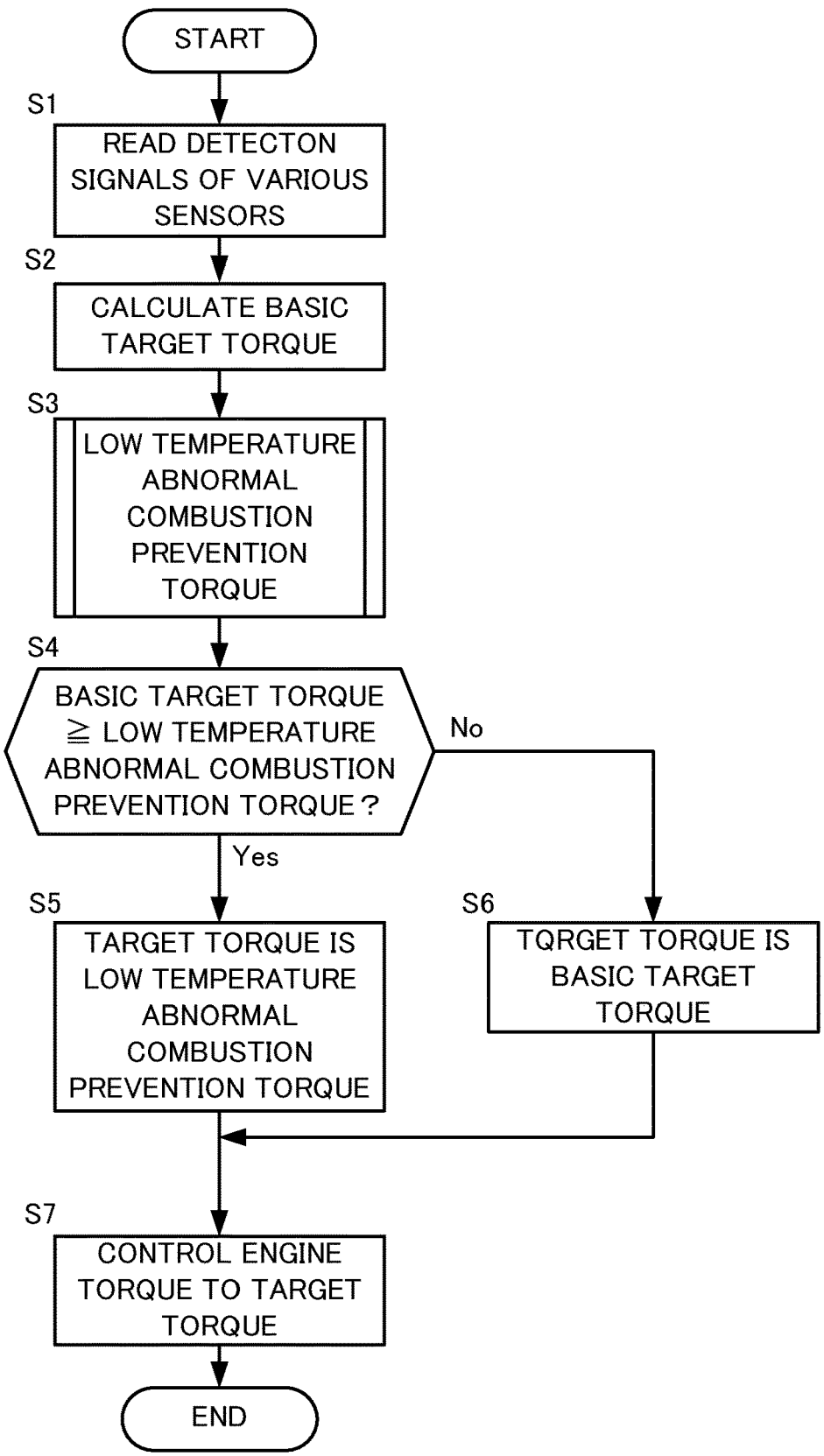
FIG. 2 is a flow chart describing about an engine torque control according to the first embodiment of the present invention.

FIG. 2 is a flow chart describing an engine torque control according to the present embodiment carried out by a controller 4, to prevent the occurrence of the low temperature abnormal combustion.

In step S1, the controller 4 reads the detection signals of various sensors.

Figure 3:
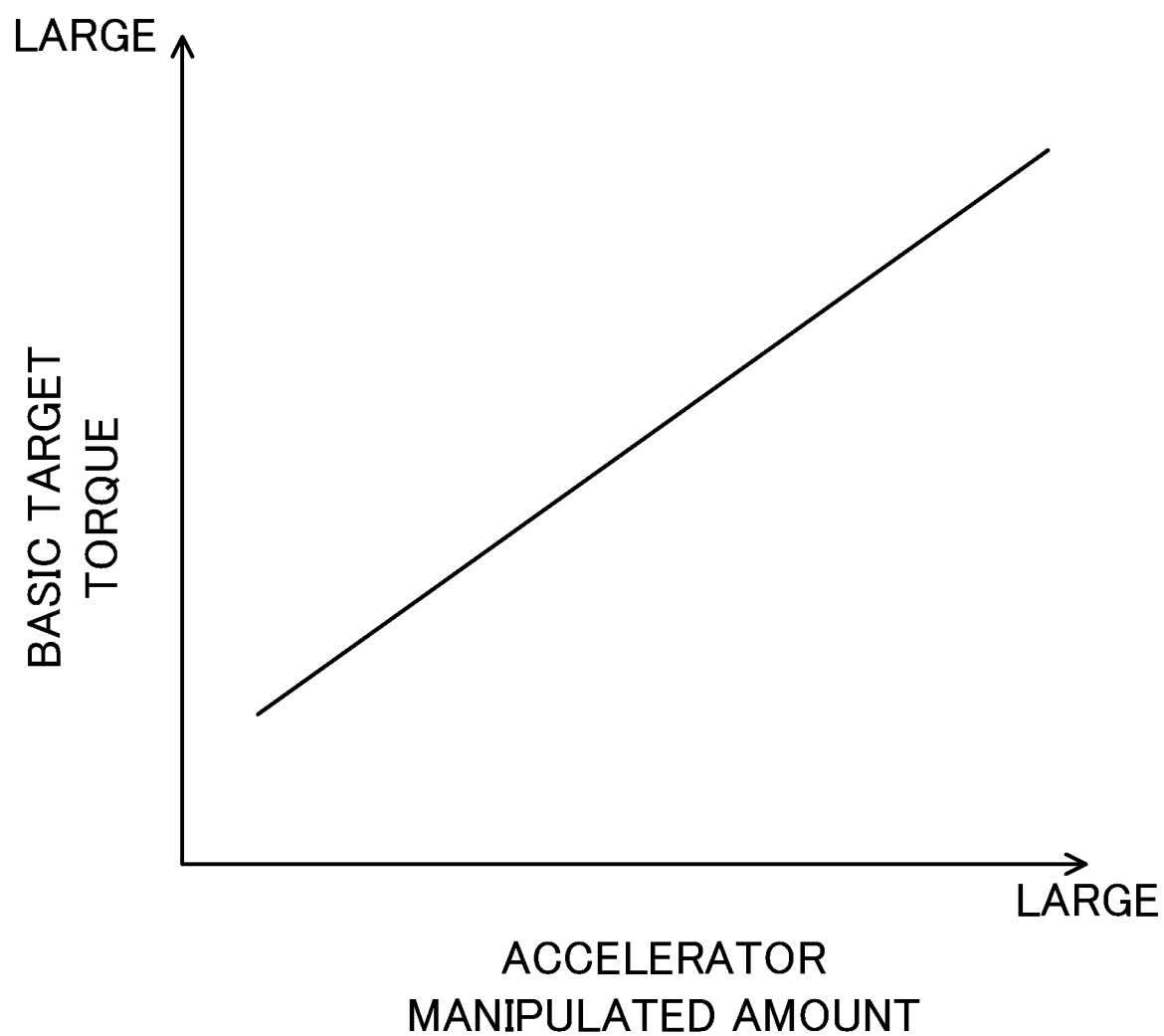
FIG. 3 is a table for calculating a basic target torque on the basis of an accelerator manipulated amount.

In step S2, the controller 4 refers to the table in FIG. 3, and calculates a torque requested by a driver to the engine 1 on the basis of an accelerator manipulated amount (engine load) (hereinafter, called "basic target torque").

In step S3, the controller 4 carries out a calculation process of an upper limit of the engine torque for preventing the occurrence of the low temperature abnormal combustion (hereinafter, called "low temperature abnormal combustion prevention torque"). Details of this low temperature abnormal combustion prevention torque calculation process are described later with reference to FIG. 4.

In step S4, the controller 4 determines whether the basic target torque is equal to or more than the low temperature abnormal combustion prevention torque. When the basic target torque is equal to or more than the low temperature abnormal combustion prevention torque, the controller 4 makes processes proceed to step S5, and when the basic target torque is lower than the low temperature abnormal combustion prevention torque, the controller 4 makes processes proceed to step S6.

In step S5, the controller 4 sets a target torque of the engine 1 to the low temperature abnormal combustion prevention torque. As such, when the basic target torque is equal to or more than the low temperature abnormal combustion prevention torque, the upper limit of the engine torque is restricted to the low temperature abnormal combustion prevention torque, to hold down the fuel injection amount and prevent the occurrence of the low temperature abnormal combustion. If focusing on just the point of preventing the low temperature abnormal combustion, the target torque may be set to a torque equal to or lower than the low temperature abnormal combustion prevention torque; however, in consideration of driving abilities, it is desirable to set the target torque to the low temperature abnormal combustion prevention torque.

In step S6, the controller 4 sets the target torque of the engine 1 to the basic target torque. As such, when the basic target torque is lower than the low temperature abnormal combustion prevention torque, setting the target torque to the basic target torque prevents the occurrence of the low temperature abnormal combustion, and allows for outputting a torque as requested by the driver.

In step S7, the controller 4 sets a target value for items such as the throttle aperture and fuel injection amount in accordance with the target torque, and controls the engine torque to the target torque.

Figure 4:
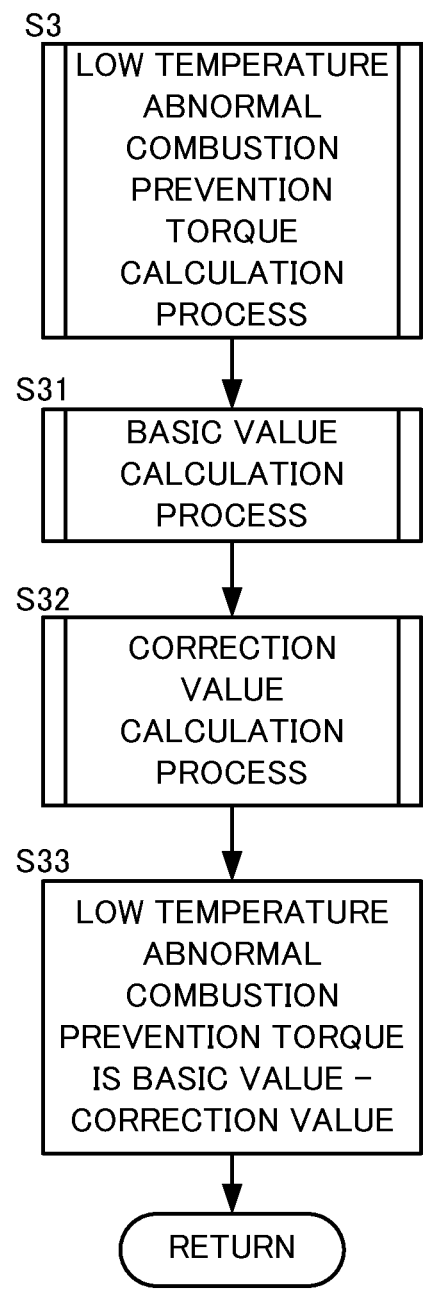
FIG. 4 is a flow chart describing about a low temperature abnormal combustion prevention torque calculation process according to the first embodiment of the present invention.

FIG. 4 is a flow chart describing the low temperature abnormal combustion prevention torque calculation process.

In step S31, the controller 4 carries out a process for calculating a basic value of the low temperature abnormal combustion prevention torque, on the basis of the cylinder wall temperature and the engine rotation speed. Details of this basic value calculation process are described later with reference to FIG. 5.

In step S32, the controller 4 carries out a process for calculating a correction value of the low temperature abnormal combustion prevention torque, on the basis of the intake air temperature. Details of this correction value calculation process are described later with reference to FIG. 7.

In step S33, the controller subtracts the correction value from the basic value, to calculate the low temperature abnormal combustion prevention torque.

Figure 5:
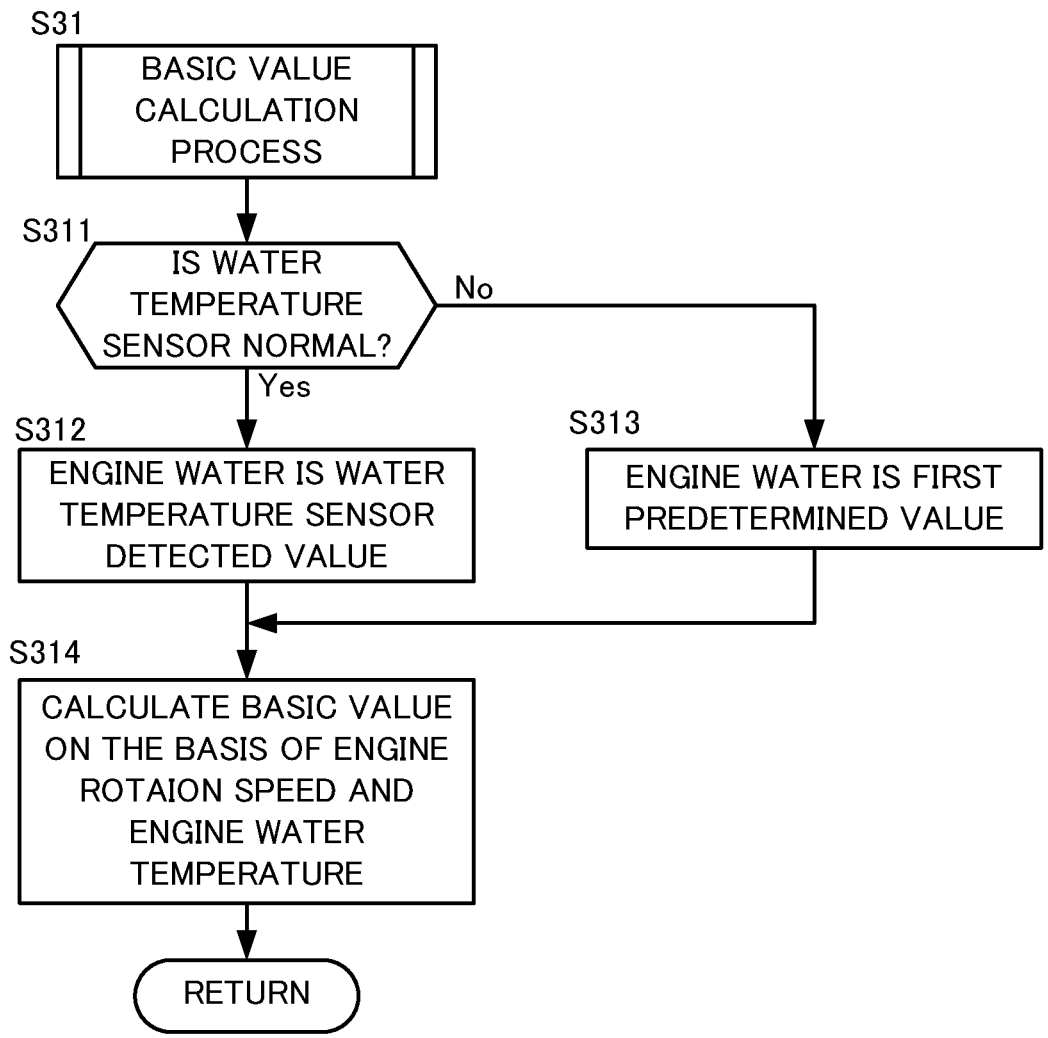
FIG. 5 is a flow chart describing about a basic value calculation process of a low temperature abnormal combustion prevention torque.

FIG. 5 is a flow chart describing the basic value calculation process of the low temperature abnormal combustion prevention torque.

In step S311, the controller 4 determines whether or not the water temperature sensor 41 is normal. That is to say, the controller 4 determines whether or not a detected value of the water temperature sensor 41 shows an abnormal value, due to breakage of the water temperature sensor 41 or any disconnection/shortage of wirings thereof. When the controller 4 determines that the water temperature sensor 41 is normal, the controller 4 makes processes proceed to step S312, and if determined as abnormal, the controller 4 make processes proceed to step S313.

In step S312, the controller 4 sets an engine water temperature detected by the water temperature sensor 41 as the cylinder wall temperature to be used in step S314. As such, when the water temperature sensor 41 is normal, the engine water temperature in correlation with the cylinder wall temperature is used instead of the cylinder wall temperature.

In step S313, the controller 4 sets a first predetermined value for a fail-safe, as the cylinder wall temperature to be used in step S314. If the engine water temperature detected by the water temperature sensor 41 is set as the cylinder wall temperature when the water temperature sensor 41 is showing abnormality, the cylinder wall temperature may be set to a higher value than an actual value thereof. This makes it impossible to calculate a suitable basic value of the low temperature abnormal combustion prevention torque in step S314. Accordingly, when the water temperature sensor 41 shows abnormality, a minimum value that the water temperature sensor 41 can detect (=first predetermined value) is set as the cylinder wall temperature, as a fail-safe.

Figure 6:
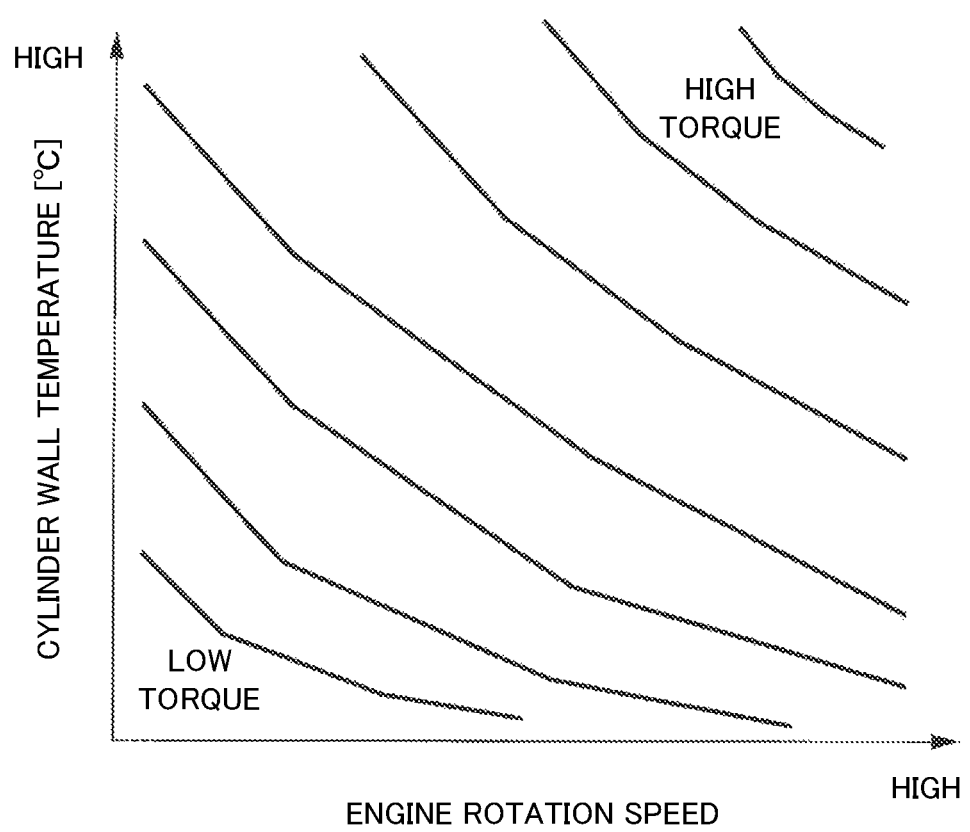
FIG. 6 is a map for calculating a basic value of a low temperature abnormal combustion prevention torque, on the basis of cylinder wall temperatures and engine rotation speed.

In step S314, the controller 4 calculates the basic value of the low temperature abnormal combustion prevention torque on the basis of the cylinder wall temperature and the engine rotation speed, with reference to FIG. 6.

As shown in FIG. 6, since the low temperature abnormal combustion occurs more easily with a lower cylinder wall temperature, the basic value of the low temperature abnormal combustion prevention torque is small for lower cylinder wall temperatures. This is because, as already described, the lower the cylinder wall temperature is, the more the fuel that adheres to the cylinder wall surface as droplets increases and the lower the viscosity of the mixture is, which thus causes easy dispersion of the mixture within the combustion chamber 15 at the time of piston ascending.

Moreover, as shown in FIG. 6, the basic value of the low temperature abnormal combustion prevention torque is small for a lower engine rotation speed, since the low temperature abnormal combustion easily occurs with the lower engine rotation speed. This is because, with a lower engine rotation speed, there is more time until the mixture dispersed inside the combustion chamber 15 evaporates and self-ignites.

In the present embodiment, although the engine water temperature in correlation with the cylinder wall temperature is used instead of the cylinder wall temperature, the cylinder wall temperature may directly be detected by a wall temperature sensor, and this detected value may serve as the cylinder wall temperature, for example. Moreover, the engine oil temperature in correlation with the cylinder wall temperature may be used instead of the cylinder wall temperature. Furthermore, the fail-safe at the time of breakage of the wall temperature sensor and the oil temperature sensor 42 may be the same as that at the time of breakage of the water temperature sensor 41.

Figure 7:
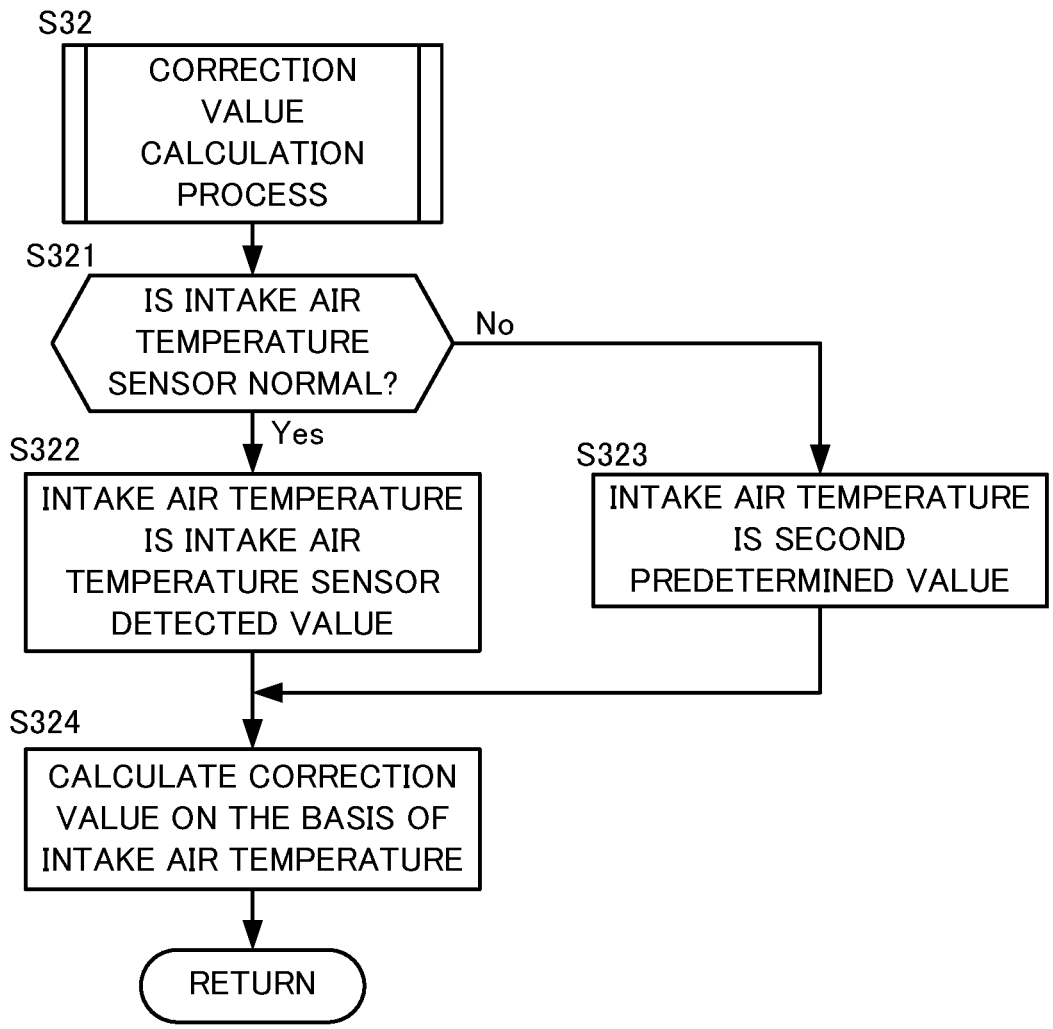
FIG. 7 is a flow chart describing about a correction value calculation process of a low temperature abnormal combustion prevention torque according to the first embodiment of the present invention.

FIG. 7 is a flow chart describing the correction value calculation process of the low temperature abnormal combustion prevention torque.

In step S321, the controller 4 determines whether or not the intake air temperature sensor 45 is normal. That is to say, the controller 4 determines whether or not a detected value of the intake air temperature sensor 45 shows an abnormal value, due to a breakage of the intake air temperature sensor 45 or any disconnection/shortage of the wiring thereof. When the intake air temperature sensor 45 is determined as normal, the controller 4 make processes proceed to step S322, and when determined as abnormal, the controller 4 make processes proceed to S323.

In step S322, the controller 4 sets the intake air temperature detected by the intake air temperature sensor 45 as the intake air temperature to be used in step S324.

In step S323, the controller 4 sets a second predetermined value for the fail-safe as the intake air temperature to be used in step S324. If the correction value of the low temperature abnormal combustion prevention torque is calculated in step S324 on the basis of the intake air temperature detected at the intake air temperature sensor 45 when the intake air temperature sensor 45 shows an abnormality, a suitable correction value cannot be calculated. Accordingly, when the intake air temperature sensor 45 shows abnormality, a maximum value that can be detected by the intake air temperature sensor 45 (=second predetermined value) is set as the intake air temperature, as the fail-safe.

Figure 8:
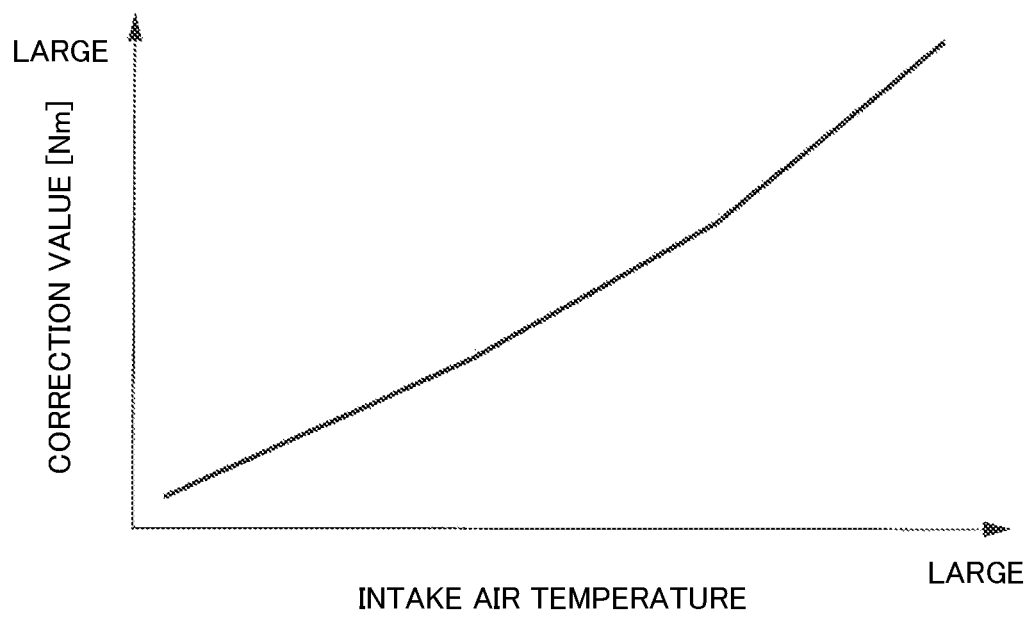
FIG. 8 is a table according to the first embodiment of the present invention for calculating a correction value of the low temperature abnormal combustion prevention torque on the basis of an intake air temperature.

In step S324, the controller 4 refers to the table in FIG. 8, to calculate the correction value of the low temperature abnormal combustion prevention torque on the basis of the intake air temperature.

As shown in FIG. 8, the correction value of the low temperature abnormal combustion prevention torque increases as the intake air temperature increases. This is because the temperature inside the cylinder tends to increase with a higher intake air temperature, which makes it easier for the self-ignition to occur; therefore, there is a need to increase the correction value and reduce the low temperature abnormal combustion prevention torque.

Figure 9:
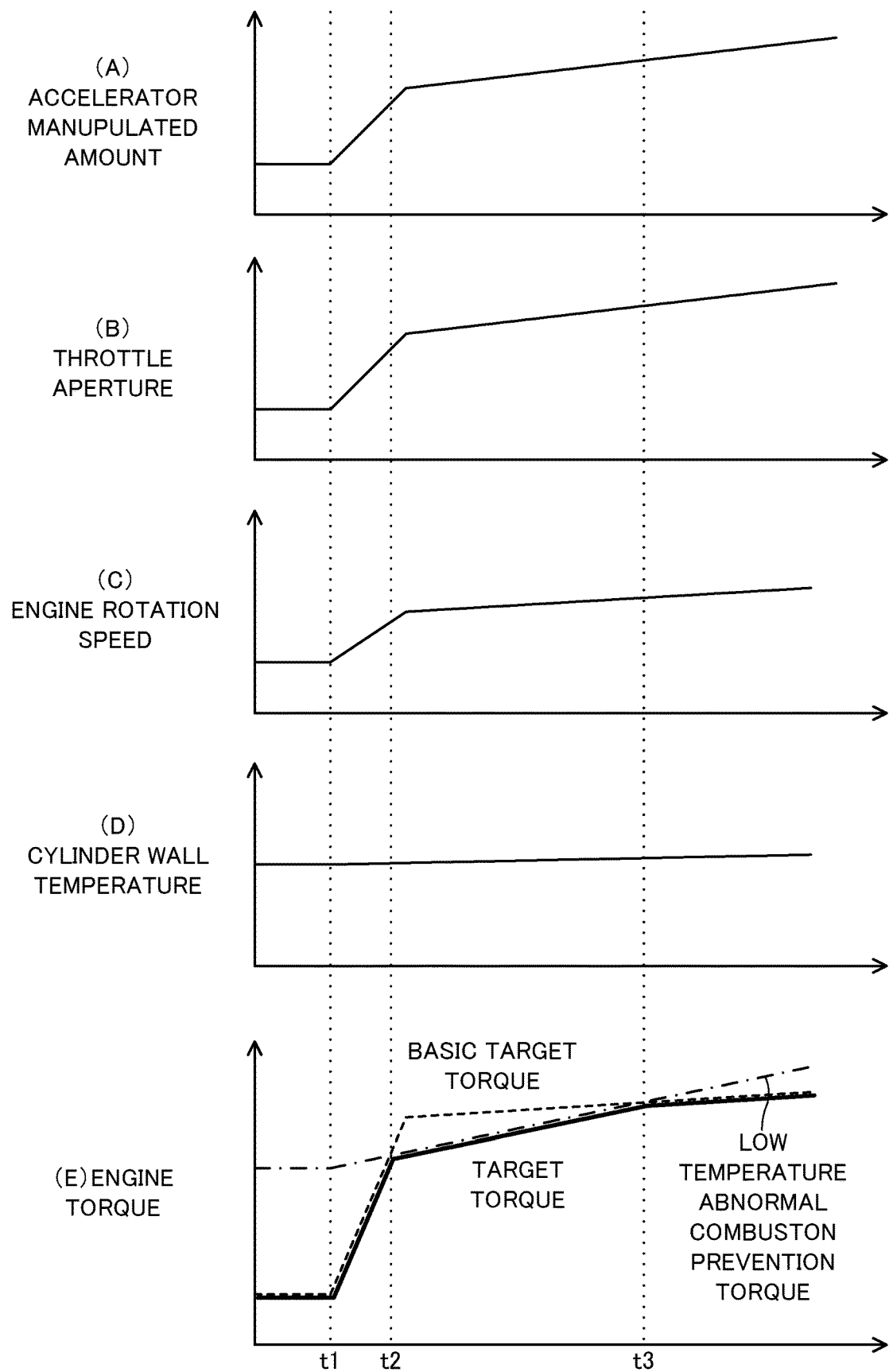
FIG. 9 is a time chart describing about an operation of an engine torque control according to the first embodiment of the present invention.

FIG. 9 is a time chart describing operations of the engine torque control according to the present embodiment.

When the accelerator manipulated amount increases at time t1, the basic target torque increases in accordance with the increased amount of the accelerator manipulated amount.

From time t1 to time t2, the basic target torque is smaller than the low temperature abnormal combustion prevention torque, and thus the target torque of the engine 1 is set as the basic target torque, and together with an increase in the basic target torque, the throttle aperture increases, and the engine rotation speed increases.

When the basic target torque becomes equal to or more than a low temperature abnormal combustion prevention torque at time t2, the target torque of the engine 1 is set as the low temperature abnormal combustion prevention torque, and the upper limit of the engine torque is restricted. Accordingly, it is possible to hold down the fuel injection amount and prevent the occurrence of the low temperature abnormal combustion.

Here, since time t1, the low temperature abnormal combustion prevention torque gradually increases together with the increase in the cylinder wall temperature and the increase in the engine rotation speed. As a result, at time t3, the low temperature abnormal combustion prevention torque becomes greater than the basic target torque, and the target torque of the engine 1 is again set as the basic target torque.

The control device of the engine 1 according to the present embodiment described above calculates the low temperature abnormal combustion prevention torque to prevent an abnormal combustion due to self-ignition whose heat source is a mixture of supplied fuel to the engine 1 and lubricant oil, on the basis of the cylinder wall temperature of the engine 1 or temperatures of parameters in correlation with the cylinder wall temperature (such as engine water temperature or engine oil temperature), and controls the torque of the engine 1 so that the torque of the engine 1 does not become equal to or more than the low temperature abnormal combustion prevention torque.

Accordingly, it is possible to suitably restrict the upper limit of the engine torque in accordance with the cylinder wall temperature and hold down the fuel injection amount, thus allowing for preventing the occurrence of the low temperature abnormal combustion.

Moreover, the control device of the engine 1 according to the present embodiment makes the low temperature abnormal combustion prevention torque smaller as the cylinder wall temperature or the temperatures of the parameters become lower.

The low temperature abnormal combustion becomes easier to occur as the cylinder wall temperature becomes lower, since the amount of fuel that adhere to the cylinder wall surface as droplets increase. Therefore, by making the low temperature abnormal combustion prevention torque smaller as the cylinder wall temperature or the temperatures of the parameters become lower to restrict the upper limit of the engine torque, it is possible to hold down the fuel injection amount and hold down the amount of fuel to be adhered to the cylinder wall surface. This thus allows for preventing the occurrence of the low temperature abnormal combustion.

Moreover, by calculating the low temperature abnormal combustion prevention torque using the temperatures of the parameters in correlation with the cylinder wall temperature, the low temperature abnormal combustion prevention torque can be easily calculated without adding for example a sensor to detect the cylinder wall temperature.

Moreover, the control device of the engine 1 according to the present embodiment calculates the low temperature abnormal combustion prevention torque on the basis of the cylinder wall temperature or the temperatures of the parameters, and furthermore the engine rotation speed, and makes the low temperature abnormal combustion prevention torque smaller as the engine rotation speed becomes lower.

The low temperature abnormal combustion more easily occurs as the engine rotation speed becomes lower, since there is more time for the mixture dispersed within the combustion chamber 15 to evaporate and self-ignite. Therefore, by calculating the low temperature abnormal combustion prevention torque by further considering the engine rotation speed in addition to the cylinder wall temperature, it is possible to more securely prevent the occurrence of the low temperature abnormal combustion.

Moreover, the control device of the engine 1 according to the present embodiment determines an abnormality of a sensor that detects the cylinder wall temperature or the temperatures of parameters (wall temperature sensor, water temperature sensor 41, oil temperature sensor 42). Furthermore, when an abnormality of the sensor is determined, the cylinder wall temperature or the temperatures of the parameters are set to a minimum value of the sensors that detect them (predetermined lower limit value), to calculate the low temperature abnormal combustion prevention torque.

Accordingly, at the time of sensor abnormality, the low temperature abnormal combustion prevention torque is set as a low value for fail-safe; it is thus possible to prevent the occurrence of the low temperature abnormal combustion even at the time of sensor abnormality.

Moreover, the control device of the engine 1 according to the present embodiment corrects the low temperature abnormal combustion prevention torque to be smaller, as the intake air temperature of the engine 1 becomes higher.

The low temperature abnormal combustion becomes easier to occur at a higher intake air temperature, since the temperature inside the cylinder increases and thus allows for easy occurrence of self-ignition. Therefore, by correcting the low temperature abnormal combustion prevention torque in accordance with the intake air temperature, it is possible to set the low temperature abnormal combustion prevention torque in accordance with an external environmental temperature in which the engine 1 is used. This thus prevents any unnecessary restriction of the upper limit of the engine torque to the low temperature abnormal combustion prevention torque, and can prevent the deterioration in the accelerating performance and output performance.

Moreover, the control device of the engine 1 according to the present embodiment determines an abnormality of the intake air temperature sensor 45, and when an abnormality of the intake air temperature sensor 45 is determined, the intake air temperature is set to a maximum value of the intake air temperature sensor 45 (predetermined upper limit value) to calculate the low temperature abnormal combustion prevention torque.

This sets the correction value of the low temperature abnormal combustion prevention torque to the value for a fail-safe at the time of abnormality of the intake air temperature sensor 45; accordingly, even at the time of the abnormality of the intake air temperature sensor 45, it is possible to prevent the occurrence of the low temperature abnormal combustion.

Moreover, the control device of the engine 1 according to the present embodiment uses a temperature of intake air compressed by the turbocharger 23, or a temperature of intake air that has passed through the intercooler 24, as the intake air temperature to be used in the correction of the low temperature abnormal combustion prevention torque. Accordingly, it is possible to calculate a suitable correction value and prevent the occurrence of the low temperature abnormal combustion.

Second Embodiment

Next describes a second embodiment of the present invention. The present embodiment differs from the first embodiment in the calculation method of the correction value of the low temperature abnormal combustion prevention torque. The following describes mainly on this difference. Parts in the following embodiments that perform the same functions as in the aforementioned first embodiment are designated with identical reference signs, and any duplicating descriptions will be omitted as appropriate.

Figure 10:
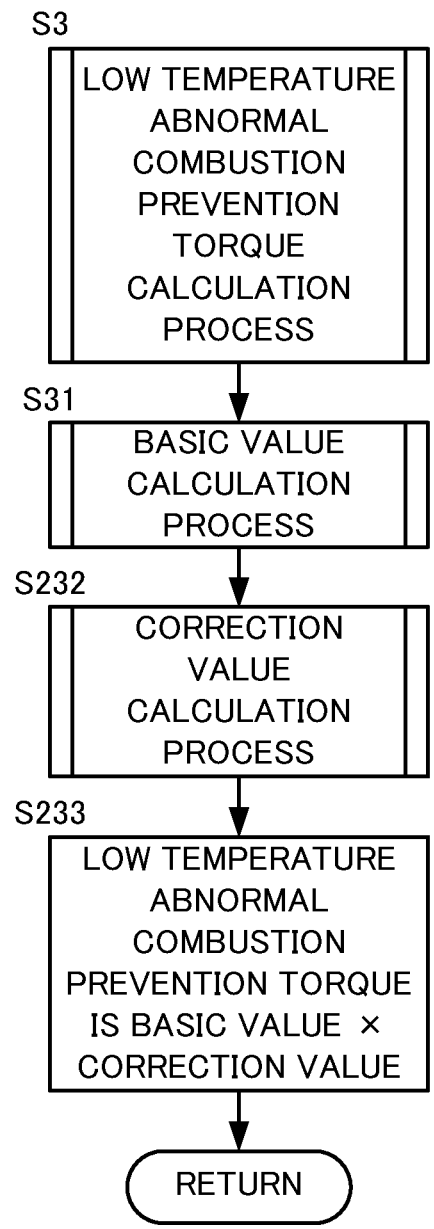
FIG. 10 is a flow chart describing about a low temperature abnormal combustion prevention torque calculation process according to a second embodiment of the present invention.

FIG. 10 is a flow chart describing a low temperature abnormal combustion prevention torque calculation process according to the second embodiment.

In step S31, the controller 4 carries out the same process as in the first embodiment.

In step S232, the controller 4 carries out a process for calculating a correction value of the low temperature abnormal combustion prevention torque, on the basis of the intake air temperature. Details on the correction value calculation process of this second embodiment are described later with reference to FIG. 11.

In step S233, the controller multiplies the correction value with the basic value to calculate the low temperature abnormal combustion prevention torque.

Figure 11:
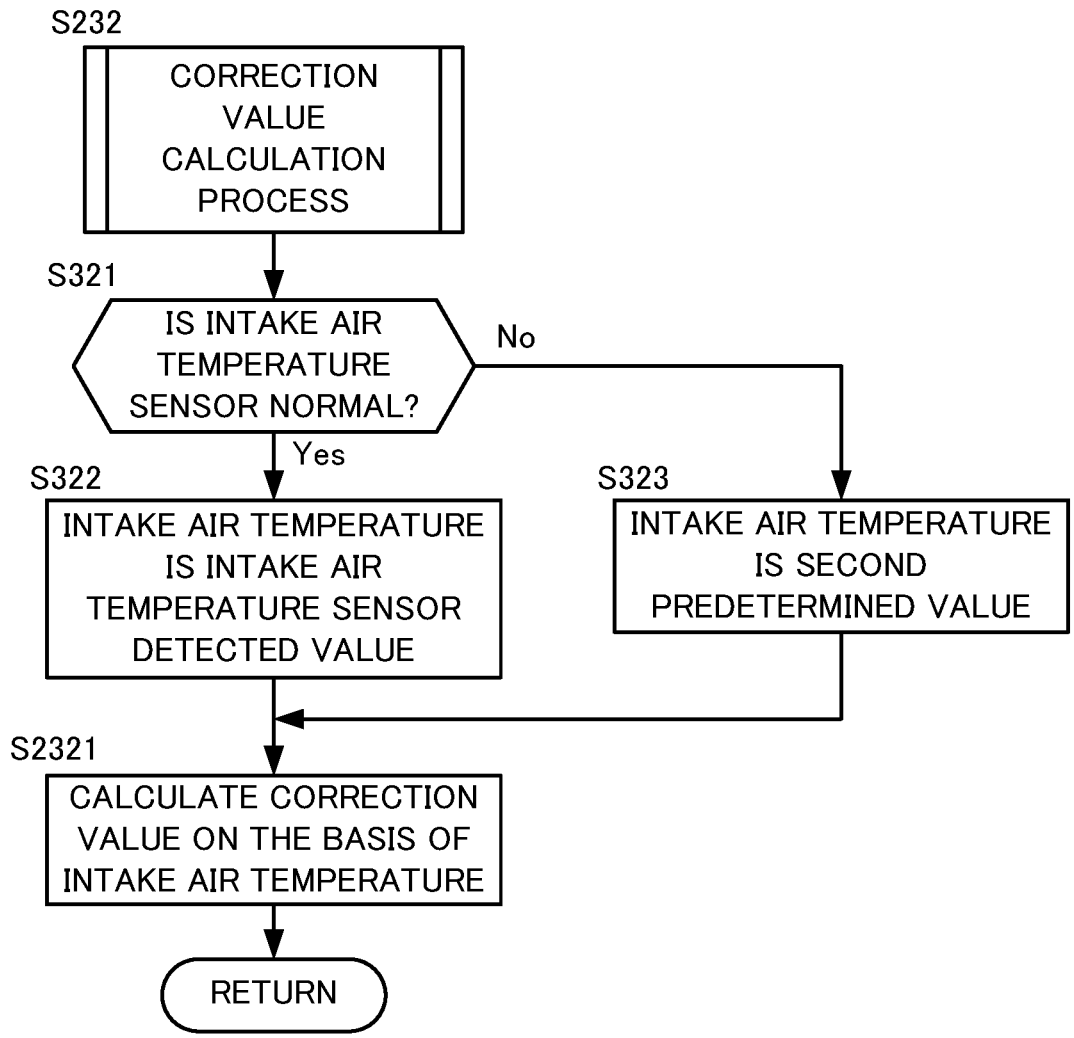
FIG. 11 is a flow chart describing about a correction value calculation process of a low temperature abnormal combustion prevention torque according to the second embodiment of the present invention.

FIG. 11 is a flow chart describing about the correction value calculation process of the low temperature abnormal combustion prevention torque according to the second embodiment.

From step S321 to step S323, the controller 4 carries out the same processes as in the first embodiment.

Figure 12:
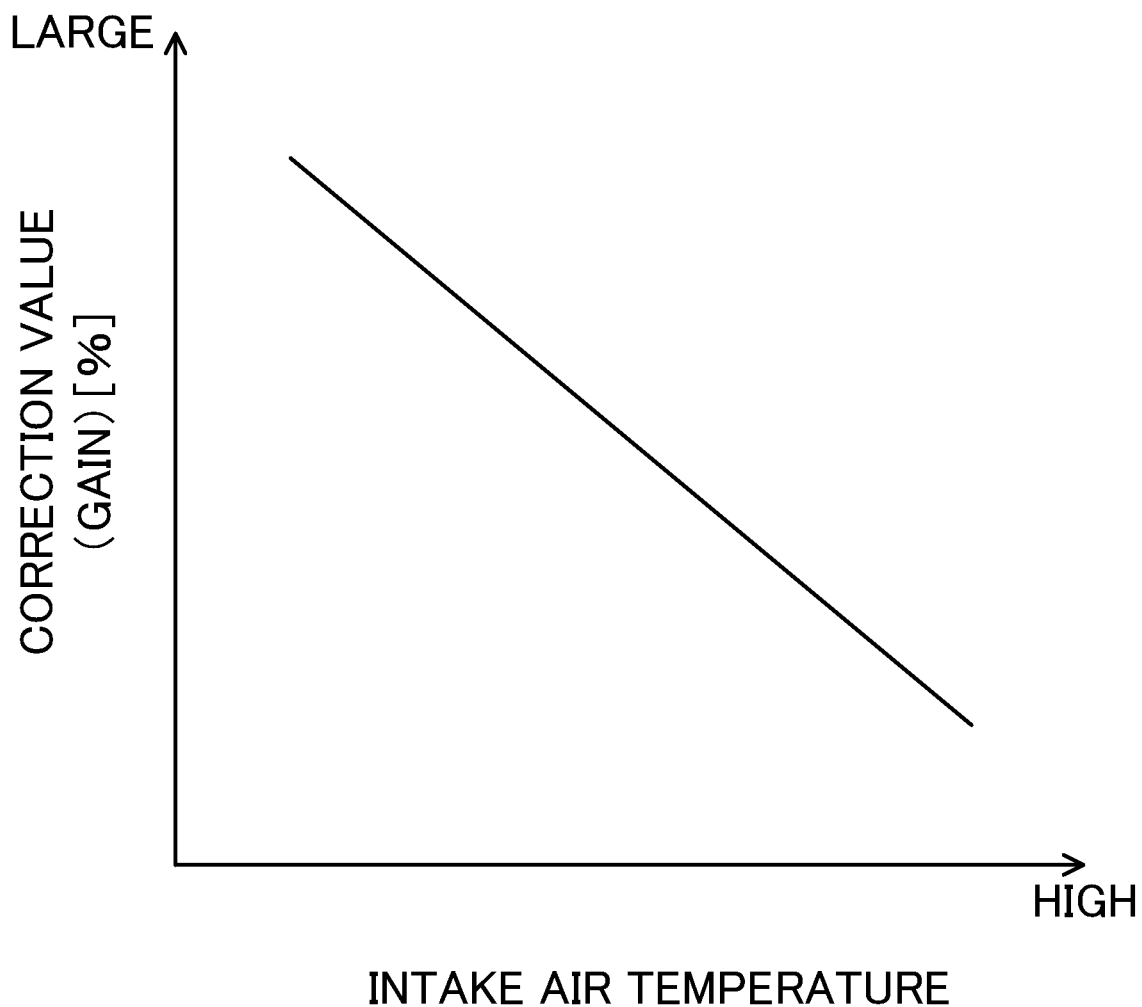
FIG. 12 is a table according to the second embodiment of the present invention for calculating a correction value of a low temperature abnormal combustion prevention torque on the basis of an intake air temperature.

In step S2321, the controller 4 refers to the table in FIG. 12, and calculates a correction value of the low temperature abnormal combustion prevention torque (corrected gain) on the basis of the intake air temperature.

As shown in FIG. 12, the correction value of the low temperature abnormal combustion prevention torque according to the second embodiment is set in percentage so that the higher the intake air temperature is, the lower the low temperature abnormal combustion prevention torque is. More specifically, the more the intake air temperature increases, the more the correction value of the low temperature abnormal combustion prevention torque according to the second embodiment is set to be reduced.

Even with the engine torque control according to the second embodiment described above, it is possible to achieve the same effects as in the first embodiment.

The above describes the embodiments of the present invention, however the above embodiments merely show one part of applicable examples of the present invention, and does not aim to limit the technical scope of the present invention to the specific configurations in the above embodiments.

For example, in the above embodiments, although the first predetermined value for fail-safe is set as the cylinder wall temperature at the time of abnormality of the water temperature sensor 41, a detected value of the oil temperature sensor 42 may be set as the cylinder wall temperature. This allows for preventing the engine torque from being restricted more than necessary by the low temperature abnormal fuel suppression torque becoming too small.

Moreover, in the above embodiment, although the description is provided by using the engine 1 of a cylinder direct injection type with a supercharger, this may be an engine of natural intake, or may be an engine of a port injection type. The type of the supercharger is also not limited to a turbocharger, and may also be a mechanical supercharger.

Moreover, in the above embodiments, as shown in the map of FIG. 6, the basic value of the low temperature abnormal combustion prevention torque was made to be smaller with a lower cylinder wall temperature. However, in a temperature region of the cylinder wall temperature that is assumed to become high in occurrence frequency of the low temperature abnormal combustion, that is to say, in a temperature region in which the cylinder wall temperature is equal to or lower than a predetermined value, the basic value of the low temperature abnormal combustion prevention torque may be fixed to a predetermined small torque value. That is to say, when the cylinder wall temperature is equal to or lower than the predetermined value, the basic value of the low temperature abnormal combustion prevention torque is fixed evenly to the predetermined small torque value, and when the cylinder wall temperature is higher than the predetermined value, the basic value of the low temperature abnormal combustion prevention torque may be set to a value sufficiently higher than the maximum value of the basic target torque for example, so that the basic value torque is not limited by the low temperature abnormal combustion prevention torque. Moreover, when the cylinder wall temperature is higher than the predetermined value, the basic target torque may be set as the target torque simply.

In such a way, it is possible to reduce the number of processes to create a map and allow for preventing the occurrence of the low temperature abnormal combustion more easily.

What is claimed is:

1. A control device of an internal combustion engine including a controller having a processor and memory, the controller configured to execute a method comprising:
    determining an abnormality of a detected value of a temperature detector that detects a cylinder wall temperature or a temperature of a parameter in correlation with the cylinder wall temperature, the abnormality due to an abnormality of the temperature detector;
    upon determining the abnormality of the detected value of the temperature detector, setting a value of the cylinder wall temperature or the temperature of the parameter to a predetermined lower limit value;
    calculating an abnormal combustion prevention torque that prevents an abnormal combustion when the cylinder wall temperature of the internal combustion engine is at a low temperature due to self-ignition whose heat source is a mixture of supplied fuel to the internal combustion engine and lubricant oil, on the basis of the value of the cylinder wall temperature or the temperature of the parameter in correlation with the cylinder wall temperature, wherein the abnormal combustion prevention torque becomes smaller as the cylinder wall temperature or the temperature of the parameter becomes lower; and controlling a torque of the internal combustion engine to prevent the torque of the internal combustion engine from becoming equal to or more than the abnormal combustion prevention torque.

2. The control device of an internal combustion engine according to claim 1, wherein calculating the abnormal combustion prevention torque is on the basis of i) the value of the cylinder wall temperature or the temperature of the parameter in correlation with the cylinder wall temperature, and ii) an engine rotation speed of the internal combustion engine, and wherein the abnormal combustion prevention torque becomes smaller as the engine rotation speed of the internal combustion engine becomes lower.

3. A control device of an internal combustion engine including a controller having a processor and memory, the controller configured to execute a method comprising:

calculating an abnormal combustion prevention torque that prevents an abnormal combustion when a cylinder wall temperature of the internal combustion engine is at a low temperature due to self-ignition whose heat source is a mixture of supplied fuel to the internal combustion engine and lubricant oil, on the basis of the cylinder wall temperature or a temperature of a parameter in correlation with the cylinder wall temperature;

determining an abnormality of a detected value of an intake air temperature detector that detects an intake air temperature, the abnormality due to an abnormality of the intake air temperature detector;

upon determining the abnormality of the detected value of the intake air temperature detector, setting a value of the intake air temperature to a predetermined upper limit value; and correcting the abnormal combustion prevention torque based on the setting of the value of the intake air temperature to the predetermined upper limit value, wherein the corrected abnormal combustion prevention torque becomes smaller as the intake air temperature of the internal combustion engine becomes higher.

4. The control device of an internal combustion engine according to claim 3, further comprising:

a supercharger that compresses intake air of the internal combustion engine; and an intercooler that cools the intake air compressed by the supercharger, wherein a temperature of the intake air compressed by the supercharger, or a temperature of the intake air passed through the intercooler, is used as the intake air temperature.

5. The control device of an internal combustion engine according to claim 1, wherein the temperature of the parameter is an engine water temperature or an engine oil temperature.

6. A control method of an internal combustion engine, comprising:

determining an abnormality of a detected value of a temperature detector that detects a cylinder wall temperature or a temperature of a parameter in correlation with the cylinder wall temperature, the abnormality due to an abnormality of the temperature detector;

upon determining the abnormality of the detected value of the temperature detector, setting a value of the cylinder wall temperature or the temperature of the parameter to a predetermined lower limit value;

calculating an abnormal combustion prevention torque that prevents an abnormal combustion when the cylinder wall temperature of the internal combustion engine is at a low temperature due to self-ignition whose heat source is a mixture of supplied fuel to the internal combustion engine and lubricant oil, on the basis of the value of the cylinder wall temperature or the temperature of the parameter in correlation with the cylinder wall temperature wherein the abnormal combustion prevention torque becomes smaller as the cylinder wall temperature or the temperature of the parameter becomes lower; and controlling a torque of the internal combustion engine to prevent the torque of the internal combustion engine from becoming equal to or more than the abnormal combustion prevention torque.

7. The control device of an internal combustion engine according to claim 1, wherein the method further comprises:

setting the abnormal combustion prevention torque to a predetermined fixed torque value when the cylinder wall temperature or the temperature of the parameter in correlation with the cylinder wall temperature is less than or equal to a predetermined value.

8. The control device of an internal combustion engine according to claim 1, wherein the method further comprises:

calculating a basic target torque of the internal combustion engine on the basis of a load of the internal combustion engine;

determining whether the basic target torque is greater than or equal to the abnormal combustion prevention torque;

setting a target torque of the internal combustion engine to the abnormal combustion prevention torque when the basic target torque is greater than or equal to the abnormal combustion prevention torque; and setting the target torque of the internal combustion engine to the basic target torque when the basic target torque is less than the abnormal combustion prevention torque, wherein controlling the torque of the internal combustion engine to prevent the torque of the internal combustion engine from becoming equal to or more than the abnormal combustion prevention torque includes:

controlling the torque of the internal combustion engine to the target torque by setting a target value of one or more of a throttle aperture, a fuel injection amount, and an ignition time.

* * * * *